Figure 1:
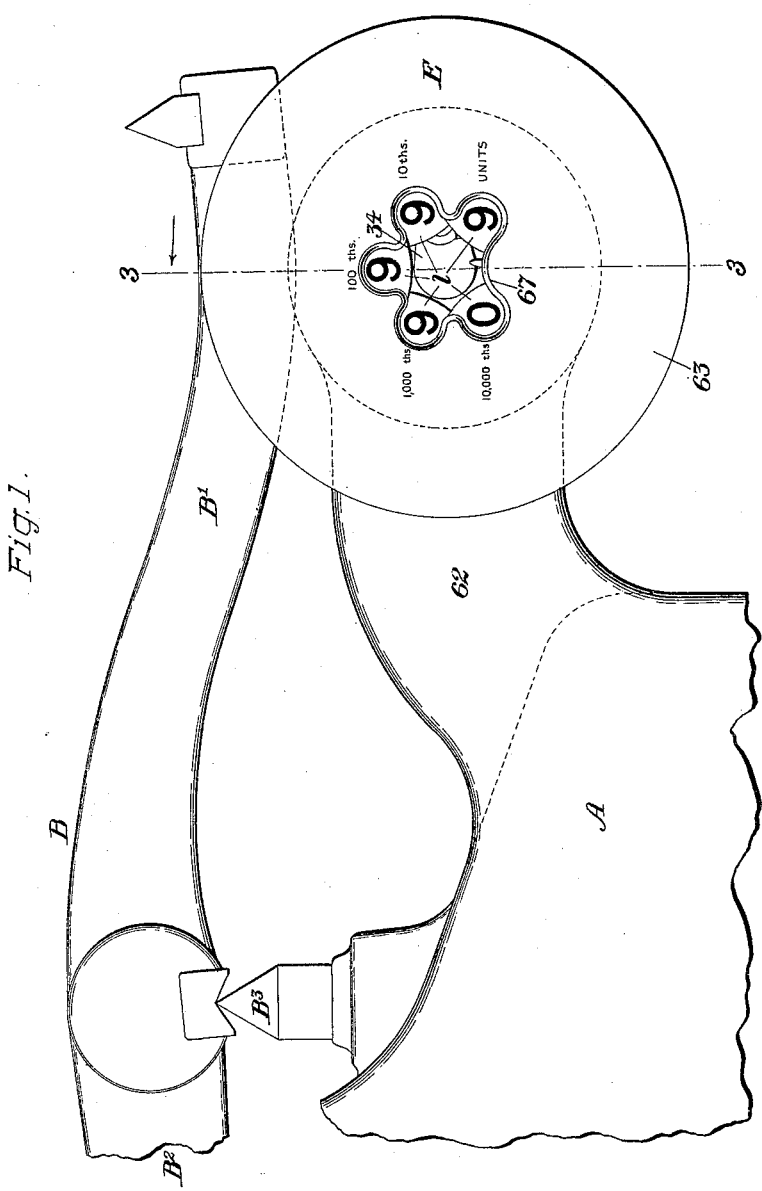

(No Model.)
7 Sheets—Sheet 1.

F. H. RICHARDS.
REGISTERING MECHANISM.

No. 546,748. Patented Sept. 24, 1895.

Witnesses:
John L. Edwards Jr.
Fred. J. Dole.

Inventor:
F. H. Richards (No Model.)  F. H. RICHARDS.  7 Sheets—Sheet 2.
REGISTERING MECHANISM.
No. 546,748.  Patented Sept. 24, 1895.

Witnesses:
John L. Edwards Jr.
Fred. J. Dole.

Inventor:
F. H. Richards (No Model.)  7 Sheets—Sheet 3.

F. H. RICHARDS.
REGISTERING MECHANISM.

No. 546,748. Patented Sept. 24, 1895.

Witnesses:
John L. Edwards Jr.
Fred. J. Dole.

Inventor:
F. H. Richards (No Model.)

F. H. RICHARDS.
REGISTERING MECHANISM.

No. 546,748. Patented Sept. 24, 1895.

7 Sheets—Sheet 4.

Witnesses:
John L. Edwards Jr.
Fred. J. Dole.

Inventor:
F. H. Richards (No Model.) 7 Sheets—Sheet 5.
F. H. RICHARDS.
REGISTERING MECHANISM.
No. 546,748. Patented Sept. 24, 1895.
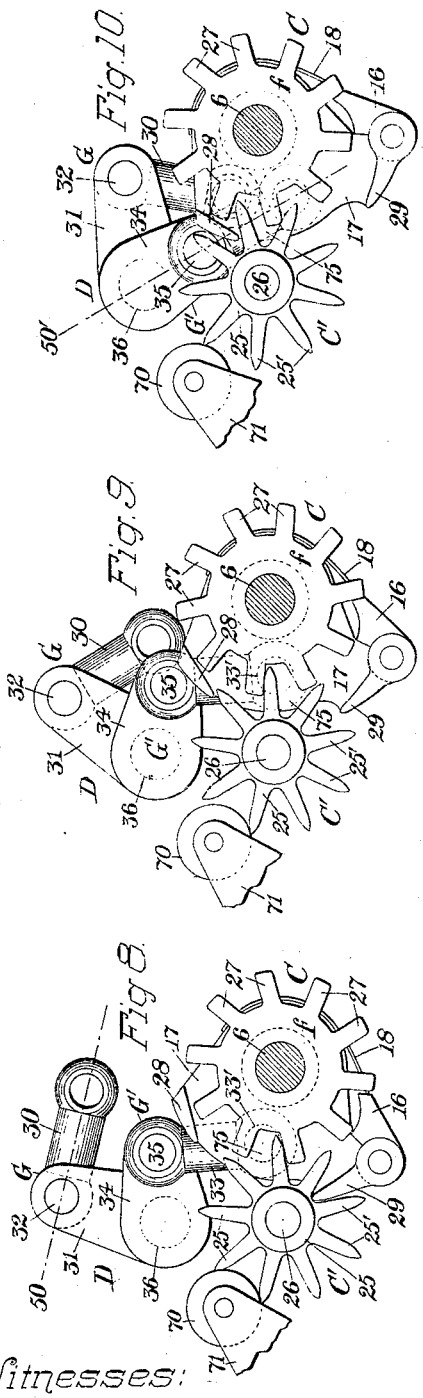
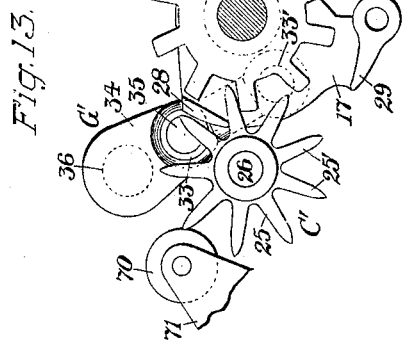
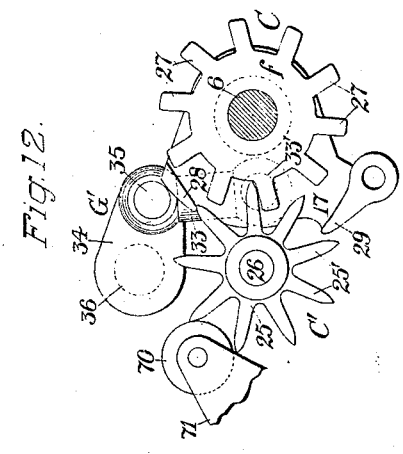
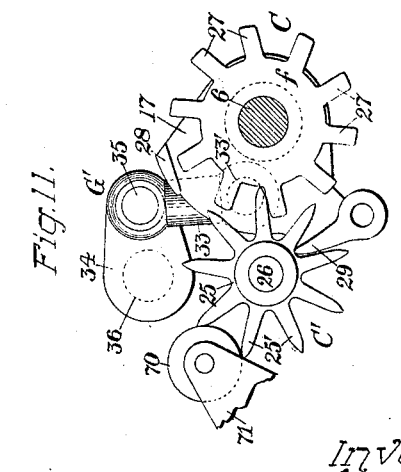
Witnesses:
John L. Edwards Jr.
Fred. J. Dole.
Inventor:
F. H. Richards (No Model.)
F. H. RICHARDS.
REGISTERING MECHANISM.
No. 546,748.
7 Sheets—Sheet 6.
Patented Sept. 24, 1895.
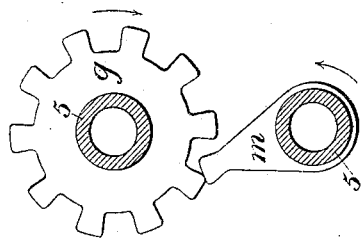
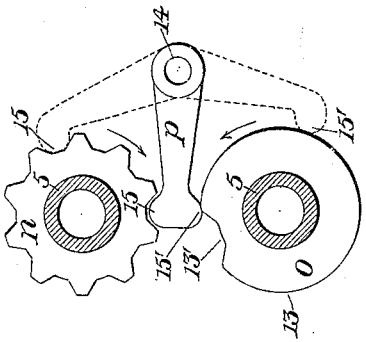
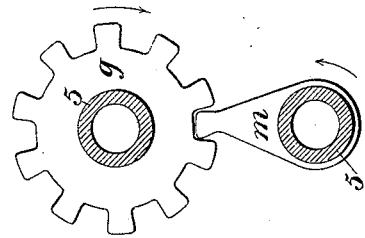
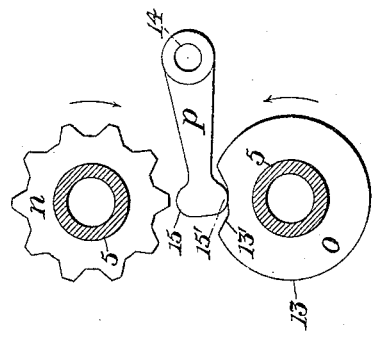
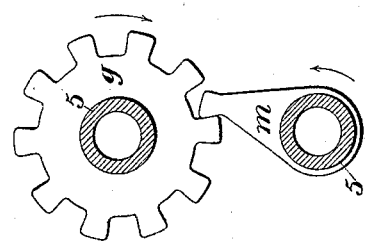
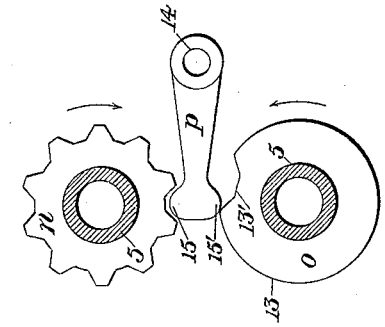
Witnesses:
John L. Edwards Jr.
Fred. J. Dole.
Inventor:
F. H. Richards (No Model.)  7 Sheets—Sheet 7.
F. H. RICHARDS.
REGISTERING MECHANISM.
No. 546,748. Patented Sept. 24, 1895.
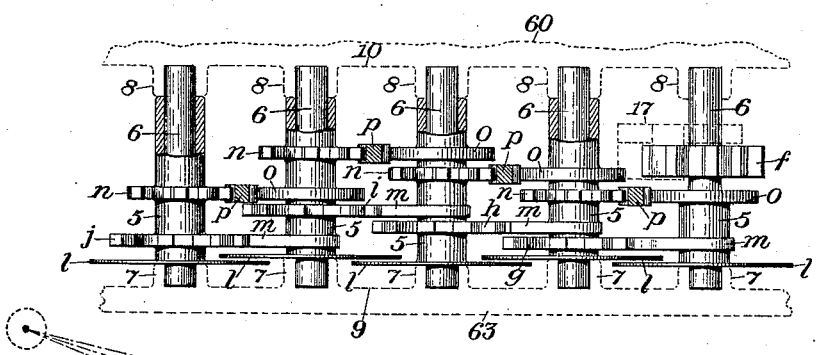
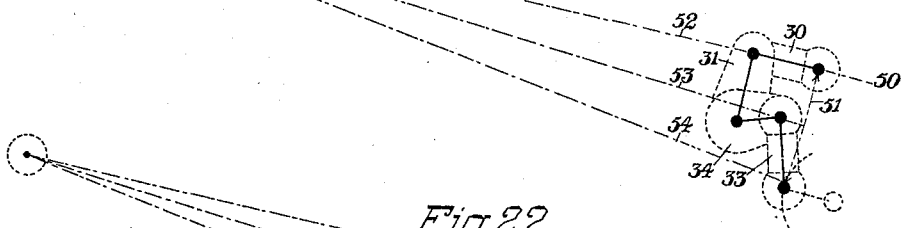
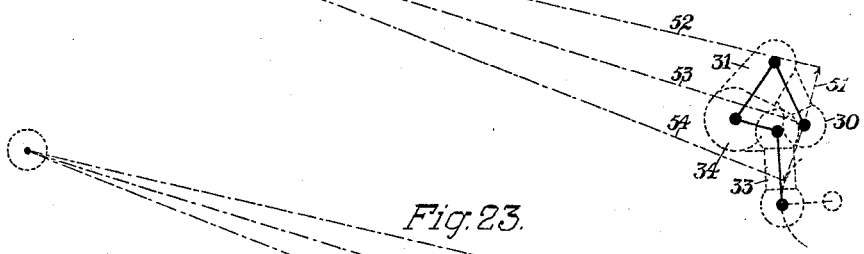
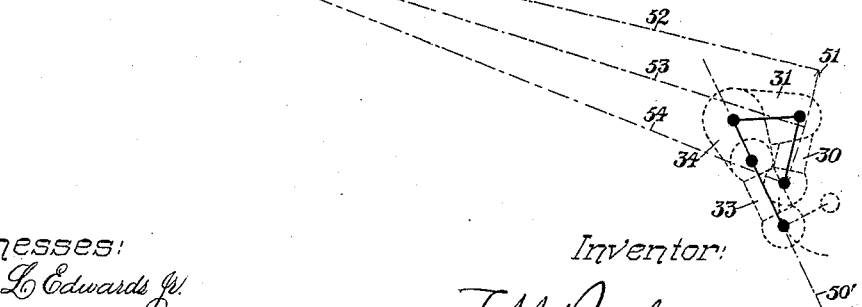
Witnesses:
John L. Edwards Jr.
Fred. J. Dole.
Inventor:
F. H. Richards

UNITED STATES PATENT OFFICE.

FRANCIS H. RICHARDS, OF HARTFORD, CONNECTICUT.

REGISTERING MECHANISM.

SPECIFICATION forming part of Letters Patent No. 546,748, dated September 24, 1895.

Application filed March 3, 1894. Renewed February 15, 1895. Serial No. 538,521. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Registering Mechanisms, of which the following is a specification.

This invention relates to registering apparatus for registering the movements of the reciprocatory parts of machines, the object being to furnish an improved and effective registering mechanism especially adapted for use in connection with automatic weighing-machines for positively registering the movements of the scale-beams thereof and to so construct and organize the registering mechanism that it will operate for long periods of time without any attention and without material wear.

For illustrating the application and mode of operation of my improvements these are herein shown as applied to the scale-beam arm of an automatic weighing-machine of the class described in Letters Patent of the United States No. 442,719, granted to me December 16, 1890, said weighing-machine being only partially shown in the drawings of this application.

Figure 2:
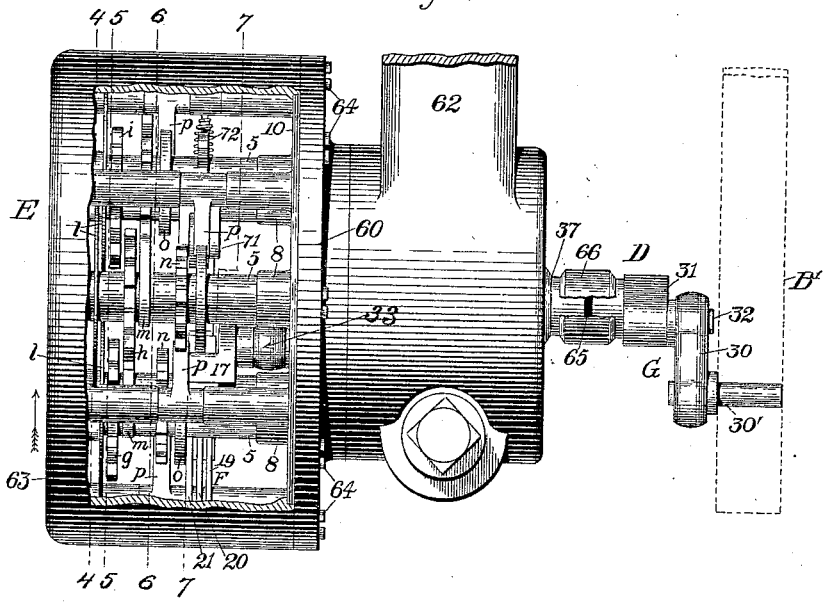
Figure 3:
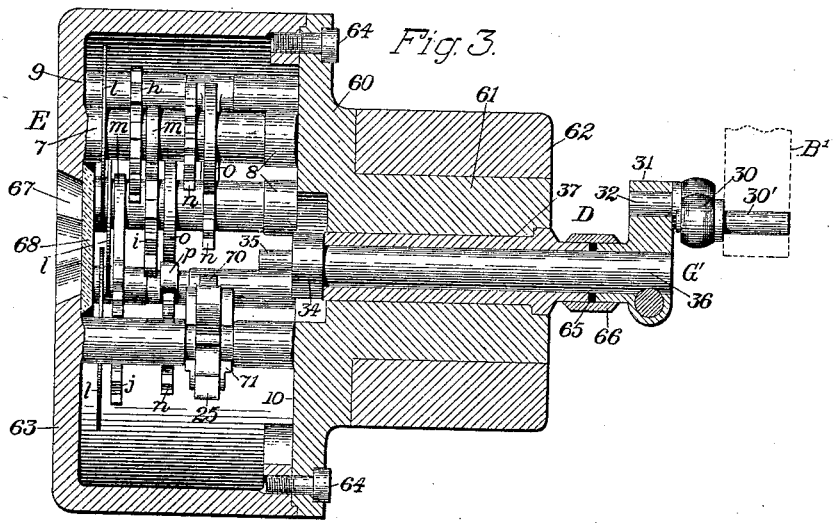
Figure 5:
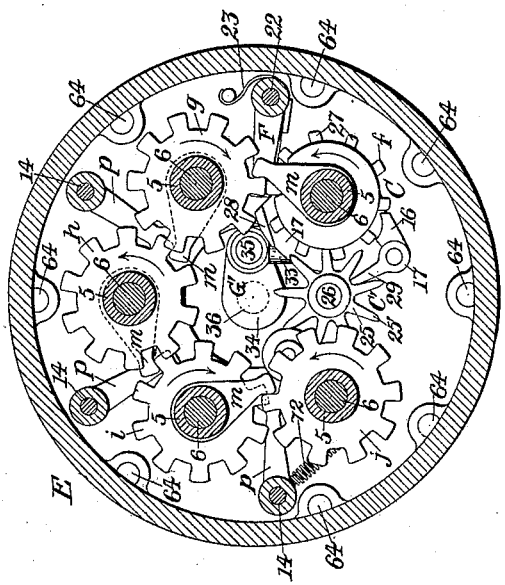
Figure 4:
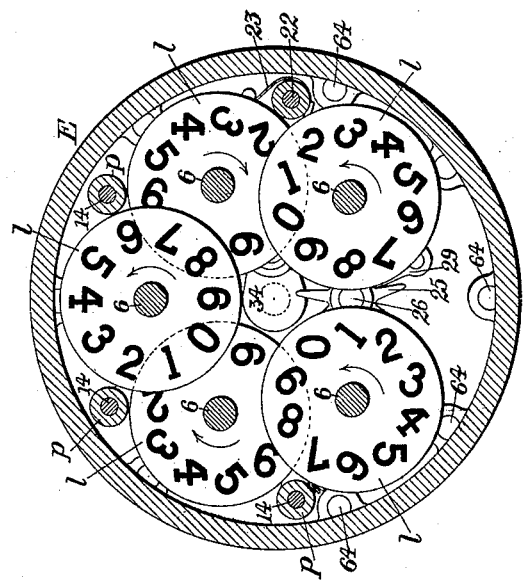
Figure 7:
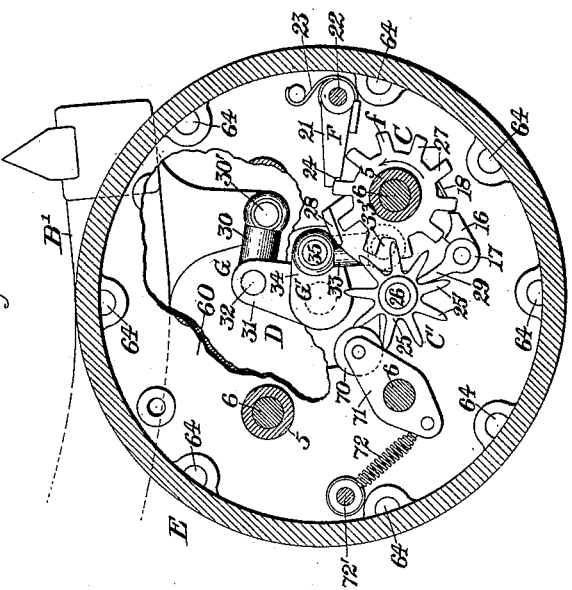
Figure 6:
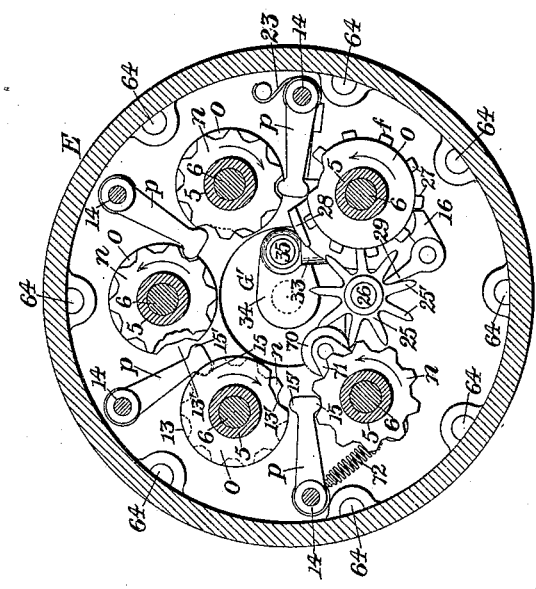

In the drawings accompanying and forming a part of this specification, Figure 1 is a front elevation of a portion of an automatic weighing-machine of the class specified with a complete registering mechanism embodying my improvements connected therewith in proper operative position with relation to the beam-arm of said machine. Fig. 2 is a plan view of a portion of the frame of a grain-weigher and the registering apparatus as seen from the top in Fig. 1, a portion of the casing of the registering apparatus being broken away to more clearly show the working parts thereof. Fig. 3 is a vertical longitudinal section of the same, taken in line 3 3, Fig. 1, looking in the direction of the arrow, the beam-arm being shown in dotted lines. Fig. 4 is a cross-sectional view of the registering apparatus, taken in dotted line 4 4, Fig. 2, looking from the left-hand side of said figure. Fig. 5 is a cross-sectional view of the registering apparatus, taken in line 5 5, Fig. 2, looking from the left-hand side in said figure. Fig. 6 is a similar cross-sectional view taken in line 6 6, Fig. 2, looking from the left-hand side of said figure. Fig. 7 is a cross-sectional view taken in dotted line 7 7, Fig. 2, looking from the left-hand side of said figure, a portion of the rear wall of the case and parts of the mechanism being broken away. Figs. 8, 9, and 10 are front views of the ratchet and the escapement feed mechanisms and their connections, with the other parts of the registering apparatus removed, said figures showing the ratchet feed mechanism in operation and illustrating three successive positions of said mechanism. Figs. 11, 12, and 13 are views similar to those shown in Figs. 8, 9, and 10, with the exception that the pawl of the ratchet-wheel is removed and the escapement feed mechanism is in operation. Figs. 14, 15, and 16 are front views of one of the register-wheels and the transmission-lever or actuator therefor, said figures illustrating three successive positions of said wheel and actuator. Figs. 17, 18, and 19 are front views of one of the stop-wheels of the stop mechanism, the wheel-lock in connection therewith, and the actuator for said wheel-lock, said figures, as in the figures just described, illustrating three successive positions of said parts. Fig. 20 is a developed view of the register mechanism, partially in section, with the actuator and feed mechanism shown in dotted lines, said figure illustrating the operative relations of the parts thereof to each other. Figs. 21, 22, and 23 are diagrammatic views illustrating the duplex linkage which forms the connection between the reciprocatory member whose movements are to be registered and the actuator of the register mechanism, said figures showing the three successive positions of said linkage when the reciprocatory member is in its upper neutral position, middle position, and lower neutral position, respectively.

The same characters designate the same or like parts in all the figures.

In the mechanism shown in the drawings the arm B' of the scale-beam B is a reciprocatory member whose movements are to be registered. Said scale-beam, as also shown in the patent hereinbefore referred to, is supported by a knife-edge at B³ on the framework A of the automatic weighing-machine. The bucket (not herein shown) of the weighing-machine will be carried by the forward arm B² of the scale-beam, and the usual weight (not shown) for counterbalancing the bucket will be carried by said arm B'.

The dial mechanism of the register, in the preferred form thereof herein shown, consists of a series of successive register-wheels or carriers, (herein shown as five in number and designated by $f$, $g$, $h$, $i$, and $j$, respectively,) each carrying a dial $l$, a series of intermediate transmission-levers or actuators $m$, a series of stop-wheels $n$, a series of locking-wheels $o$, and a series of wheel-lockers $p$, one for each stop-wheel and located intermediate to said stop-wheel and its adjacent locking-wheel. As a means for actuating the dial mechanism or register-train I have provided, in connection with said register-train and with the reciprocatory member whose movements are to be registered, a compound feed device, so designated as it comprises two feed devices in operative connection with one another (which feed devices are designated in a general way by C and C', respectively) and an actuator (designated in a general way by 17) in position and adapted for operatively engaging one or the other of said feed devices C and C', said actuator being herein shown as operatively connected with the reciprocatory member whose movements are to be registered by means of the duplex or quarter-stroke linkage, (designated in a general way by B.) The construction, organization, and operation of this compound feed mechanism will be hereinafter more fully described. The two feed devices C and C' comprised in the compound feed mechanism, and which will be hereinafter termed the "primary feed device" and "secondary feed device," respectively, are constructed and organized for independent operation and are adapted to have reciprocally effective and ineffective operations in so far as operating the dial mechanism is concerned—that is to say, the primary feed device C is so constructed and is so organized in itself and relatively to the co-operating mechanism as to be normally effective for operating the register-train, whereas the secondary device C', which is in the nature of a safety device, is so constructed and is so organized relatively to the actuator and the register-train as to be normally inoperative in so far as affecting the operation of said register-train is concerned, but is held in abeyance and will be capable of immediate effective operation should the primary feed device become inoperative from any cause, as will be hereinafter more fully described. Each register-wheel or carrier of the series, in the form thereof herein shown, comprises a pinion having ten peripheral teeth and a hub 5, carried upon a shaft 6, journaled at its ends in bearings 7 and 8, formed upon the front and rear walls 9 and 10, respectively, of the register-case E, as most clearly shown in the developed view, Fig. 20, of the drawings. The first wheel $f$ of the series will preferably be in the nature of a ratchet-wheel and will constitute one member of the compound feed device, as will be hereinafter more fully set forth. Each of the first four register-wheels $f$ $g$ $h$ $i$ of the series of register-wheels carries a transmission-lever or actuator-arm $m$, which lever is in the nature of a one-tooth transmission wheel or segment and is adapted for intermittently engaging and for partially rotating the next succeeding wheel of the series of register-wheels. This transmission-lever or actuator-arm is constructed for moving the next succeeding wheel of the series of register-wheels the distance of one tooth, or one-tenth of a rotation, upon each complete rotation of its carrier.

To avoid prolixity in the specification the register-wheels or carriers and the transmission-levers or actuator-arms will be hereinafter termed, respectively, "register-wheels" and "levers," and the dials, register-wheels, levers, stop-wheels, and locking devices will, as a whole, be hereinafter referred to as "dial mechanism."

As a means for locking the register-wheels against movement when the levers which actuate them are out of engagement therewith I have provided a series of substantially duplicate locking devices, each of which in the preferred form thereof herein shown consists of a stop-wheel $n$, carried by one of said register-wheels, a locking-wheel $o$, carried by the adjacent register-wheel, the periphery of which comprises a locking portion 13 and an unlocking or let-off portion 13', and a wheel-locker $p$, pivotally supported, as shown at 14, and having two working faces 15 and 15', respectively, one of which 15' rests against the rim or working face of the locking-wheel $o$ and the other of which is contiguous to a stop-notch in the stop-wheel $n$. This wheel-locker $p$ may be in the nature of an arm pivotally supported, as at 14, at one end thereof and have laterally-projecting oppositely-disposed working faces 15 and 15' at the free end thereof, located intermediate to and in alignment with the axes of the stop-wheel and locking-wheel, as shown in full lines in Figs. 17, 18, and 19 of the drawings, or the construction and arrangement of said wheel-lock may be varied from that shown in full lines in said figure without departing from my invention—as, for instance, said wheel-locker might be in the nature of a lever pivotally supported near its center at one side of the stop-wheel and locking-wheel, as at 14, and have two oppositely-disposed arms with working faces 15 and 15', one of which bears against the working face of the locking-wheel $o$ and the other of which is contiguous to the stop-wheel $n$, as illustrated in dotted lines in Fig. 19. This modification in the construction and arrangement of the wheel-locker just described is within the scope of my invention, as would be various modifications thereof, and therefore a generic claim will be drawn of sufficient breadth to cover any construction and arrangement of reciprocatory wheel-locker when used in connection with a stop-wheel and a locking-wheel. Each of the first four wheels $f$, $g$, $h$, and $i$ of the series of register-wheels carries a locking-wheel $o$, and each of the last four register-wheels of the series carries a stop-wheel $n$.

The stop-wheel $n$, locking-wheel $o$, and wheel-locker $p$ of each set of locking devices are so constructed and organized that the working end of the wheel-locker will be normally retained in locked engagement with a stop-notch of the stop-wheel by the locking portion 13 of the rim or periphery of the locking-wheel. After the locking-wheel has made a complete circuit, or traveled from the position shown in Fig. 19 to that shown in Fig. 18, bringing the unlocking or let-off portion 13' of said wheel opposite the working face 15' of the locking-arm, the partial rotation of the stop-wheel by the transmission-lever forces the working end 15 (owing to the inclined faces of the stop-notch) out of engagement with said stop-notch, the let-off portion 13' of the locking-wheel $o$ permitting a lateral movement of the locking end, as shown in said Fig. 18. This locking-wheel is so arranged with relation to the register-wheel and the lever carried thereby that the locking-arm or wheel-locker will be thrown out of engagement with the stop-wheel when the lever which actuates the next succeeding register-wheel (the one that carries the stop-wheel) has made one complete rotation and is in position (in engagement with a tooth thereof) to move said register-wheel forward. This construction, arrangement, and operation leaves the successive register-wheels of the series free to be rotated upon the completion of a complete rotation of the next preceding wheel, but keeps them locked against rotation at all other times.

The compound feed mechanism for actuating the dial mechanism or register-train, as hereinbefore stated, consists principally of the primary feed device (designated in a general way by C) and the secondary or safety feed device, (designated in a general way by C'.) The primary feed device C is herein shown of the ratchet-and-pawl type, the register-wheel $f$ of the dial mechanism preferably constituting the ratchet-wheel member of said device. A pawl 16 for directly actuating the ratchet-wheel $f$ is carried by the oscillating actuator 17, which actuator is preferably supported for oscillatory movement independent of the ratchet-wheel upon the shaft 6, that carries said ratchet-wheel, the pawl 16 being normally held in yielding operative engagement with the ratchet-wheel by a spring 18, secured to the actuator 17 and bearing against said pawl, as most clearly shown in Figs. 8, 9, and 10, which figures illustrate three successive positions of the primary feed device and its actuating mechanism during the effective operation of the primary feed device. This actuator 17 is operatively connected with the reciprocatory member whose movements are to be registered by means, preferably, of the duplex-linkage connection, (designated in a general way by D,) the construction and operation of which duplex-linkage connection will be hereinafter more fully described.

The secondary or safety feed device C', which has a co-operative relation with the primary device C, just described, is in the nature of an escapement-wheel 25, which is preferably revolubly carried upon a stud 26, fixed to the register-case. This escapement-wheel has a series of radial arms or peripheral teeth 27 in position and adapted for successively engaging the teeth 27 of the ratchet-wheel $f$ as the escapement-wheel is intermittently rotated, as will be hereinafter described. As a means for intermittently actuating the escapement-wheel to render the secondary or safety feed device operative for actuating the register-train, the actuator member 17, which carries the pawl for normally actuating the ratchet-wheel, is also shown provided with oppositely-disposed pallets or feed-blades 28 and 29, located in position and adapted for alternately engaging the teeth of the escapement-wheel during the upward and downward strokes of said actuator, to thereby rotate said escapement-wheel, and through it the ratchet-wheel $f$, which wheel $f$ in this instance constitutes one of the register-wheels in the dial mechanism. This effective operation of the secondary feed device takes place only when for any reason the primary feed device becomes inoperative, which might be caused by the breaking of the retaining-spring of the pawl 16, which would cause said pawl to be thrown out of its operative position relatively to the ratchet-wheel, as will be understood by reference to Figs. 11 to 13, inclusively.

By a comparison of the two series of operative views—i. e., Figs. 8 to 10, inclusively, and Figs. 11 to 13, inclusively—it will be seen that the two revoluble members or wheels $f$ and 25 of the primary and secondary feed devices, respectively, are constantly in intermeshing relation and that the pawl 16 for actuating the ratchet-wheel $f$ and the pallets or feed-blades 28 and 29 for actuating the escapement-wheel are so disposed relatively to each other and to said wheels $f$ and 25 that the pawl 16 will normally engage the ratchet-wheel just before the pallet 28 engages the tooth of the escapement-wheel, thus securing a slight lead in the movement of the ratchet-wheel relatively to the movement of the escapement-wheel, when the primary feed device is effective for operating the register-train, which, owing to the clearance-space between the teeth of the two wheels $f$ and 25, permits a limited advancing movement of the escapement-wheel after the ratchet-wheel has made its full stroke, the escapement-wheel in this instance practically running idle. In practice the pallets 28 and 29 on the actuator 17 will be so disposed relatively to the teeth of the escapement-wheel that said escapement-wheel will be advanced the major portion of its effective stroke upon the completion of the downward stroke of the actuator and will be carried the supplementary or remaining portion of its stroke upon the completion of the upward stroke of the actuator, the pallets 28 and 29 acting alternately to advance said escapement-wheel.

In a registering mechanism of the class specified it is imperative, for the purpose of securing absolute accuracy in registration, that means be provided in connection with the feed mechanism of the register-train for not only preventing the retractive or backward movement of the feed mechanism of the register-train, but also to provide means in connection with said feed mechanism for positively limiting the advancing or feeding movement of said feed mechanism; otherwise the momentum acquired by the feed mechanism through the sudden inauguration of the advancing movement thereof would have a tendency to and would frequently effect an "overstroke" or an excess in the advancing movement of the feed mechanism and the connected register-train.

As a means for preventing a backward or retractive movement of the primary feed device I have provided in connection therewith a stop device, (designated in a general way by F,) which in this instance consists of a series of detent-arms 19, 20, and 21, pivotally carried upon a stud 22, secured to the casing, and held in contact with the ratchet-wheel of the primery feed device by means of a spring 23. These arms will usually have detent-catches 24 at the free ends thereof in position for engaging the teeth of the ratchet-wheel and are preferably located in different positions relatively to each other, so that should one of said arms fail to engage a tooth of the ratchet-wheel one or the other of the adjacent arms will be in position to and will engage therewith. It will be understood, however, that any device for preventing retractive or backward movement of the primary feed device might be employed without departing from my invention.

As a means for limiting the advancing movement of the compound feed mechanism I have provided means controlled by the movements of said actuator and adapted for engaging at predetermined points in the movement of said actuator one of the revoluble members of the compound feed mechanism and for limiting the advancing movement of said revoluble member, and consequently limiting the effective stroke of the feed mechanism. This means for limiting the advancing or feeding movement of the feed mechanism, and which will be herein termed the "feed-limiter," in the organization thereof herein shown comprises the two pallets 28 and 29, which actuate the escapement-wheel 25. By reference to Figs. 8 to 13, inclusively, it will be seen that these pallets 28 and 29 have practically two functions, they constituting stop-abutments for limiting the advancing movement of the escapement-wheel 25 and the connected ratchet-wheel $f$ when the primary feed device 3 is operated, as shown in Figs. 8 to 10, inclusively, and constitute driving-blades for the escapement-wheel when the secondary feed device 3' is operative, as shown in Figs. 11 to 13, inclusively. When the primary feed device C is directly actuated by the pawl 16 of the actuator 17, it will be observed that the escapement-wheel 25 is advanced by the ratchet-wheel $f$ and that the pallets 28 and 29 have no effective action upon the escapement-wheel, one or the other of said pallets simply entering a tooth-space, as shown in Figs. 8 and 9, at a predetermined point in the upward or downward strokes of the actuator, which brings it in position to be engaged by a tooth of the escapement-wheel should the momentum acquired by said escapement-wheel continue the advancing movement thereof beyond the position shown in Figs. 8 and 9, respectively. Thus it will be seen that upon the completion of the downward or upward stroke of the actuator one of the pallets 29 or 28 will be in position and will constitute a stop for preventing a further effective advancing movement of the escapement-wheel. It will be obvious that the construction and organization of the means carried by the actuator for limiting the effective advancing stroke of the feed mechanism might be modified within the scope and limits of my invention.

By a comparison of the two series of views—viz., Figs. 8, 9, and 10, and Figs. 11, 12, and 13—it will be observed that the actuator is reciprocal in its operation in so far as its direct action upon the ratchet-wheel of the primary feed device and the escapement-wheel of the secondary feed device is concerned, and also that the ratchet-wheel and escapement-wheel of said feed devices are reciprocal in their effective actions upon each other.

One of the principal objects of the combined feed mechanism herein described is to perform the work of actuating the dial mechanism by means of devices subject to little wear and adapted to operate for long periods of time without any attention, and also to positively insure the continued operation of the mechanism, notwithstanding one of the feed devices may become inoperative. A ratchet-and-pawl device alone as a means for actuating the dial mechanism is unsatisfactory owing to the uncertainty of its operation, which is sometimes due to the clogging of the pawl or the breaking of its retaining-spring. On the other hand, an escapement feed device alone for actuating the dial mechanism is subject to too much wear for its practical operation for long periods, although there is no uncertainty in its operation, as it has no movable parts to get out of operation. By combining these two feed devices in the manner herein set forth (the escapement-feed acting as a direct feed for the dial mechanism in case the pawl-and-ratchet feed becomes inoperative) I secure the lasting benefits of one and the positive results in operation of the other feed device, and thereby obviate uncertainty in operation and inaccuracy in registration.

In the drawings, Figs. 8, 9, and 10, the primary or ratchet feed mechanism is shown as operative and in three of the successive positions it occupies during one forward and backward stroke of the reciprocatory member whose movements are to be registered, the secondary feed device, in connection therewith, being in this instance ineffective in so far as its action upon the ratchet-wheel $f$ is concerned, it acting idly. As will be understood by reference to these figures just described, the escapement-wheel is idly rotated by the action of the ratchet-wheel when the primary or pawl-and-ratchet feed device directly actuates the dial mechanism, the pallets of the actuator in this instance, as will be seen by comparison of Figs. 8, 9, and 10, having no effective action upon the escapement-wheel other than one of them acting as a stop-abutment to limit the advancing movement of said wheel.

In Figs. 11, 12, and 13 the secondary feed device is shown as the direct source of motive power for the dial mechanism, said figures showing the three successive positions occupied by the secondary feed mechanism during one complete forward and backward movement of the reciprocatory member whose movements are to be registered. In this instance the primary feed device or pawl-and-ratchet mechanism is rendered inoperative by the removal of the actuating-pawl.

The connection between the actuator 17 (which actuator, as before described, is in operative connection with the feed mechanism of the register) and the reciprocatory member B (whose movements are to be registered) is made through a duplex or quarter-stroke linkage having two dead-centers and consisting of two single linkages (designated in a general way by G and G', respectively) operatively connected together and adapted one of them for producing one of the dead-centers at one end and the other of them the other of the dead-centers at the other end of the stroke of the duplex linkage, as will be hereinafter more fully described. In the preferred form thereof herein shown the single linkage G consists of a link 30 and a rocker-arm 31, pivotally connected together by a stud 32, and the other single linkage G' consists of a link 33 and rocker-arm 34, pivotally connected by a stud 35. The rocker-arms of the linkages G and G' are connected together by a shaft 36, journaled in a sleeve 37, secured in the register-case E, as will be hereinafter more fully described. The link 30 is pivotally connected at 30' to the beam-arm B', and the link 33 is pivotally connected at 33' to the actuator 17, as most clearly shown in Fig. 7 of the drawings. These linkages are so constructed and organized that upon the first downward stroke of the beam-arm B' from the position shown in Figs. 7, 8, and 21 the single linkage G (comprising the link 30 and rocker-arm 31) comes to its dead-center position, which dead-center is indicated by dotted line 50 most clearly in Figs. 8 and 21, and upon the completion of the downward movement of said beam-arm B' the single linkage G' comes to its dead-center position, (designated by dotted line 50' in Figs. 10 and 23.) On the return movement of said beam-arm (the linkage G being off its dead-center and the linkage G' being at its dead-center position) the linkage G' comes to its dead-center position, and upon the completion of the upward movement of the beam-arm the said linkages assume their first positions before described. Thus it will be seen that the resultant movement of the actuating member 17 takes place only during the middle portion of the stroke of said beam-arm. By means of the organization here described the total stroke of the beam-arm, which stroke is represented by the arc 51 in Figs. 21, 22, and 23, is divided into three successive periods, (indicated by the dotted dimension-lines 52, 53, and 54,) of which the middle period 53 (shown in the diagrammatic view, Fig. 22) is the effective or active period, this being located between the two neutral periods 52 and 54. The upper neutral period 52 of the beam stroke corresponds to the "poising period" of the weighing-machine, and during this period the link 30 of the first linkage G passes the line 50 of its dead-center, as most clearly indicated in the diagrammatic view, Fig. 21, so that during this period no effective movement of the rocker-arm 31 is had. In like manner, but reversely, the lower neutral period 54 of said beam stroke, as shown in Fig. 23, corresponds to the arc of the idle oscillation of the bucket mechanism of the weighing-machine, so that by reason of the organization herein described the register mechanism is not operatively effected by such oscillatory movements of said bucket mechanism. It will be remembered that in machines of the class specified on the unloading of the bucket and the sudden return movement of the scale-beam this beam has for a short period of time several oscillatory movements, which gradually decrease in extent. The first and longest of these movements will usually equal about one-fourth of the total stroke of the beam. It is thus evidently necessary, in order to secure a reliable registration of only the complete or full stroke of the reciprocatory member of the machine, to connect and operate the registering mechanism in such manner that it will not be actuated or effected by the oscillations of the scale-beam at the upper or lower neutral periods of its stroke. It is also necessary in practice that the scale-beam shall be entirely relieved of any resistance due to the operation of the registering mechanism during the poising period, or when the load is made up to its exact full weight and the bucket and counterweight (not shown) counterbalance each other. This requirement is met in my present improvements by that arrangement of the linkage whereby the links 31 and 33 stand at their dead-centers at the times specified. The case E which incloses the mechanism is intended to be closely sealed, and the mechanism is so arranged in the case that when this is partially filled with lubricating fluid parts of the mechanism will dip and carry the fluid from one part to another, so as to thoroughly lubricate the entire mechanism, and do this for long periods of time without any attention. In practice it is important that such a register will operate with the utmost certainty for several years at a time without appreciable wear or any care from the attendants.

In the form herein shown the register-case is constructed in two pieces, it consisting of the disk-shaped back plate 60, having a central hub 61, by means of which it is held in a socket formed in an arm 62 upon the frame A of the weighing-machine, and an annularly-flanged front plate 63, secured to the back plate by means of screws 64, as shown in said figure. Formed integral with the front and back plates, on adjacent faces thereof, are the journal-bearings 7 and 8, respectively, the axes of which bearings are equidistantly disposed with relation to the axis of the hub of the back plate and are adapted for supporting the shafts 6 of the dial mechanism, as will be understood by reference to Figs. 2, 3, and 20 of the drawings. The hub 61 of the back plate 60 is axially bored and has fitted therein the bearing-sleeve 37, in which the operating-shaft 36 is journaled. The outer end of said sleeve will preferably be flanged and fitted in an annular recess formed in the end of the hub 61. The rocker-arm 31 of the linkage G is keyed to the outer end of said shaft 36 and will in practice have a laterally-projecting hub, which will secure to said link a long bearing upon said shaft. Interposed between the end of the hub of the rocker-arm 31 and end of the bearing-sleeve 37 is a packing-ring 65, which is tightly impinged and closely seals the only avenue of escape of the lubricating fluid contained in the register-case. To furnish additional security against leakage, the joint between the hub of the rocker-arm 31 and sleeve 37 will be covered by a collar 66, which is slipped over the ends thereof, as shown clearly in Fig. 3, and a packing-ring of suitable material will be interposed between the back plate 60 and the end of the annular flange of the front plate 63. The front plate 63 will have an opening formed therein, as shown at 67, which opening will be covered upon the inside by a glass 68, through which the characters upon the dials of the register may be observed.

Referring to the compound feed mechanism, the organization of the primary and secondary feed devices, which constitute said compound mechanism, must be such that one cannot block the other under any circumstances—as, for instance, in case of a partial movement of the scale-beam. As a means for retaining the escapement-wheel in the proper operative position relative to the ratchet-wheel and for preventing the blocking of the mechanism by the partial rotation of the escapement-wheel due to an incompleted stroke of the scale-beam I have provided a roller-detent 70, pivotally carried at one end of a lever 71 in position to normally bear between two adjacent teeth of the escapement-wheel. This lever is pivotally supported, preferably upon one of the shafts of the register mechanism, and is held with its roller-detent in engagement with the escapement-wheel by means of a spring 72, secured at one end to the lever and at its opposite end to a stud 72′ upon the case E. By this construction and arrangement, as will be understood by reference to Figs. 8, 9, and 10 of the drawings, it will be seen that upon the forward movement of the escapement-wheel the roller will ride outward from the position shown in Fig. 8, and when said wheel has been carried more than one-half the distance of the travel imparted to it by a complete stroke of the beam-arm the roller-detent will pass over the end of the tooth of said escapement-wheel, as shown in Fig. 10, and thereafter tend, through the stress of the spring 72, to force the escapement-wheel forward until the detent-roller drops to the position shown in Fig. 8; and it will also be seen that if the stroke of the beam-arm is not sufficient to carry a tooth of the escapement-wheel under and past the central bearing-point of the detent-roller said detent-roller will immediately upon release of the stress exerted upon it by the pallets of the actuator move said wheel backward to the position it occupied before said movement of the beam-arm took place, thereby keeping the two feed mechanisms continuously in operative positions relatively to each other and obviating binding tendencies. The escapement-wheel meshes with the ratchet-wheel after the manner of a spur-gearing; but the teeth 25′ and 27 of said wheels, respectively, have between them, as shown at 75 in Figs. 8, 9, and 10, sufficient clearance-space for permitting a second movement of the escapement-wheel after the ratchet-wheel has made its full stroke.

Referring to the several views, Figs. 8, 9, and 10 of the drawings, showing the successive stages of the operations of the compound feed device, (the primary feed device or ratchet-and-pawl mechanism being in this instance operative for the purpose of actuating the dial mechanism, and the secondary feed device being idle or ineffective,) Fig. 8 shows the parts in position for beginning one cycle of movement, or in the position they occupy when the beam-arm is in its upper neutral position. In this position of the parts the lower driving blade or pallet 29 of the actuator 17 loosely engages between two teeth of the escapement-wheel, but has no operative effect thereon, and the pawl 16 of the actuator is in its retracted position, with its free end abutting against a tooth of the ratchet-wheel *f* and in position for carrying forward said ratchet-wheel upon the descent of the beam-arm. In this position of the parts one of the teeth of the escapement-wheel rests, without stress, upon one of the teeth of the ratchet-wheel. On the descent of the beam-arm from the position shown by dotted dimension-line 52 in Fig. 21 to that shown by the dotted dimension-line 53 in Fig. 22 the duplex linkage is carried from the position shown in dotted lines in Fig. 21 to the position shown by dotted lines in Fig. 22, the link 30 of the single linkage G being first carried past the dead-center line 52, and thence downward, until at the middle position of the beam-arm it has assumed the position shown in Fig. 22. During the greater portion of the movement of the link 30 from the position shown in Fig. 21 to that shown in Fig. 22 it has no perceptible effect upon the position of the link 33, connected with the actuator 17, and therefore does not have any influence up to this time in effecting any change in the relative positions of the dial mechanism. After the beam-arm has reached the middle portion of its stroke, as indicated by the dotted line 53, and the duplex linkage is in the position illustrated in Fig. 22, the continued downward movement of the scale-beam to the position indicated by dotted line 54 carries said linkage to the position illustrated in Fig. 23, this movement of the linkage from the position shown in Fig. 22 to that shown in Fig. 23 being the respective movement of the duplex linkage in its operation of effecting the registration of one movement of the scale-beam. In this operation the actuator 17, to which the link 33 is connected, is first moved downward, the pawl thereof, which is in engagement with the teeth of the ratchet-wheel, carrying said ratchet-wheel forward, as will be understood by comparison with Figs. 8 and 9 of the drawings. When the parts have reached the position shown in said Fig. 9, one tooth of the ratchet-wheel is in bearing contact with a tooth of the escapement-wheel, said escapement-wheel not having been affected by this first movement of the parts, and upon the continued movement of said actuator 17 the ratchet-wheel is carried to the completion of its stroke, as shown in Fig. 10, rotating the escapement-wheel from the position shown in Fig. 9 to that shown in Fig. 10, there being sufficient space between the contiguous teeth of the ratchet and escapement wheels when the parts are in this position to permit a further movement of said escapement-wheel independent of the ratchet-wheel, which further movement of the escapement-wheel is imparted thereto by means of the detent-roller, which at this point in the position of the parts overrides the forward tooth of the escapement-wheel, as shown in Fig. 10, and in consequence of the stress exerted by the spring 72 forces said escapement-wheel forward until it assumes a position similar to that shown in Fig. 8. This operation of the parts will be clearly understood by comparison of the several views, Figs. 8, 9, and 10, herein referred to. It will be observed that when the primary feed device is operative and the escapement-wheel is rotated by the ratchet-wheel *f* thereof the pallets or blades 28 and 29 of the actuator have no effective action upon the escapement-wheel.

On the retractive movement of the beam-arm the movements of the linkage and actuator are reversed from that just described, the pawl 16 being drawn backward over the ratchet-teeth into the position shown in Fig. 8, ready to carry the said ratchet-wheel forward on a repetition of the first movement of the beam-arm and feed-actuating mechanism.

If through any cause the ratchet-and-pawl feed mechanism should become inoperative, as by the breaking of the spring 18, the escapement-wheel will be moved forward by the alternate actions of the two pallets or blades 28 and 29 against successive teeth of the escapement-wheel, said movements of the escapement-wheel intermittently rotating the ratchet-wheel the requisite distance, as will be clearly understood by reference to Figs. 11, 12, and 13 of the drawings, which show three successive operations of the escapement feed mechanism. The ratchet-wheel having been carried forward the requisite distance, or one-tenth of a rotation, it is held against accidental backward movement by means of the spring-held detent device F, which is located to engage a tooth of said wheel at the completion of each intermittent motion thereof. The particular location of the detent device circumferentially of the ratchet-wheel is not material so long as it is located to engage and hold the ratchet-wheel in the proper position.

Having thus described my invention, I claim—

1. In a registering apparatus, the combination with a register-train and an actuator; of two independently-operative and reciprocally-effective feed devices in operative connection with the register-train, and adapted, one of them for normally actuating said register-train independent of the other, substantially as described, and for the purpose set forth.

2. In a registering apparatus, the combination with the register-train, and with a reciprocatory member whose movements are to be registered; of a compound-feed device embodying two revoluble feed-members in cooperative connection, and adapted for reciprocally actuating the register-train; and an actuator in connection with said revoluble members and with the reciprocatory member, substantially as described.

3. In a registering apparatus, the combination with a register-train, and with a reciprocatory member whose movements are to be registered; of two independent feed devices in operative connection with the register-train, and each having a feed-wheel in operative connection, one with the other, and adapted for reciprocally actuating the register-train, substantially as described.

4. In a registering apparatus, the combination with the register-train and the reciprocatory member whose movements are to be registered; of a compound-feed device, substantially as described, in operative connection with the register-train, and comprising a primary feed device and a secondary feed device having independent feed-wheels in operative connection with each other, and with the reciprocatory member, and adapted for reciprocally effective and ineffective operations.

5. In a registering apparatus, the combination with a reciprocatory member whose movements are to be registered; of a pair of peripherally-toothed register-wheels carrying dials; a transmission-lever carried by one of said wheels with its free end adapted for successively engaging the successive teeth of the other of said wheels; and a compound-feed device in operative connection with one of said wheels and with the reciprocatory member, and embodying two independently-operable and reciprocally-effective feed devices in co-operative connection, and adapted, one of them for normally actuating the register-train independent of the other, substantially as described, and for the purpose set forth.

6. The combination with the register-train of a register and with the reciprocatory member whose movements are to be registered, of a ratchet-feed wheel in operative connection with the register-train, a supplemental feed-wheel in operative connection with the ratchet-wheel, and an oscillating actuator in operative connection with the reciprocatory member and carrying means for directly actuating one or the other of said feed-wheels, whereby said register-train may be driven directly by the supplemental feed-wheel through the medium of the ratchet-feed-wheel, substantially as described and for the purpose set forth.

7. The combination with the register-train of a register, and with the reciprocatory member whose movements are to be registered, of a ratchet-feed wheel in operative connection with the register-train, a supplemental-feed wheel in operative connection with the ratchet-wheel, an oscillating actuator in operative connection with the reciprocatory member and carrying means for directly actuating one or the other of said feed-wheels, a spring-actuated roller-detent in engagement with the teeth of the supplemental-feed wheel, and a spring-held detent device in engagement with a tooth of the ratchet-feed wheel, the roller detent being adapted for retaining the supplemental-feed wheel in proper operative relation to the ratchet-feed wheel and the other detent-device being adapted for preventing retractive movement of said ratchet-feed wheel, substantially as described and for the purpose set forth.

8. In a registering-apparatus, the combination with the register-wheels operatively connected together, of a feed-wheel in connection with one of said register-wheels, means for directly and intermittently rotating said feed-wheel, and a supplemental feed-wheel in connection with the first feed-wheel, and means for operating said second feed-wheel independent of the actuating-mechanism of the first feed-wheel, substantially as described and for the purpose set forth.

9. The combination with the reciprocatory member whose movements are to be registered, and with the actuator of the register, and the connection between said actuator and reciprocatory member, of a feed-wheel in operative connection with, and adapted for moving, the register-wheels of said register, a pawl carried by the actuator and adapted for rotating said feed-wheel, a supplemental or safety-feed wheel located at one side of and in normal idle engagement with said first feed-wheel, means for retaining the supplemental feed-wheel in proper relation to the first feed-wheel and means connected with the actuator for operatively engaging and rotating said supplemental-feed wheel to operate the register-wheels in case the pawl should become inoperative, substantially as described and for the purpose set forth.

10. The combination with the reciprocatory member, the register-train actuator, and the connection between said actuator and reciprocatory member, of a ratchet-wheel operated by a pawl carried by said actuator and adapted for imparting movement to the register-train, an escapement-wheel connected with said ratchet-wheel and adapted to be operated to rotate said ratchet-wheel in case the direct actuating-mechanism of the ratchet-wheel should become inoperative, and means for rotating said escapement-wheel directly from the actuator, and means for retaining said escapement-wheel in operative position with relation to the ratchet-wheel, substantially as described.

11. The combination with the register-train of a register; of a compound-feed mechanism in operative connection with the register-train, and comprising two independent feed devices in co-operative relation—viz., a pawl-and-ratchet-feed device in position and adapted for normally and independently actuating the register-train continuously; and a supplemental feed device in operative connection with the pawl-and-ratchet-feed device, and controlled in its effective operation by the stopping of said ratchet-feed device, substantially as described, and for the purpose set forth.

12. The combination with the register-train of a register; of a compound-feed mechanism consisting of a pawl-and-ratchet feed device; and an independent, supplemental feed device in operative connection with said pawl-and-ratchet feed device; an actuator adapted for engaging with and for operating one or the other feed device; and detent devices in engagement with and adapted for holding the feed mechanism against retractive movement, substantially as described.

13. The combination with the register-train, the reciprocatory member whose movements are to be registered, and the feed-actuator; of a compound feed device in operative connection with the register-train and feed-actuator, and comprising two independent, and reciprocally-effective feed members in co-operative connection; and means carried by the feed-actuator in position and adapted for engaging and rotating said members, reciprocally, substantially as described.

14. In a registering apparatus, the combination with the reciprocatory members whose movements are to be registered, and with a register-train; of a primary and a secondary feed device, each having a revoluble-feed member in operative connection with the other, and one of which is in direct operative connection with the register mechanism; and a feed-actuator in connection with the reciprocatory member and the feed devices, and adapted for effectively operating one of said feed devices, independent of, and during the ineffective operation of the other of said feed devices, and vice versa; substantially as described.

15. In a registering apparatus, the combination with the register-train; of two independent feed devices in co-operative connection, and each embodying an independent, revoluble-feed member and an actuator therefor, substantially as described.

16. In a registering apparatus, the combination with the register-train; of two independently-operative intermeshing feed-wheels in operative connection with said register-train; and an actuator in position and adapted for engaging and actuating said feed-wheels, reciprocally and independently, substantially as described, and for the purpose set forth.

17. In a registering-apparatus, the combination with the register-train, of two operatively-connected feed-wheels, one of which is in direct operative connection with the register-train and both of which are adapted for reciprocally-actuating one another, and means in position and adapted for directly actuating one or the other of said feed-wheels, substantially as described and for the purpose set forth.

18. In a registering-apparatus, the combination with the register-train, of a compound feed-mechanism embodying two intermeshing feed-wheels; an actuator in position and adapted for imparting an advancing movement to said feed-wheels and means controlled by said actuator for limiting the advancing movement of said feed-wheels, substantially as described and for the purpose set forth.

19. In a registering apparatus, the combination with the register-train; of a compound-feed mechanism comprising two independent feed devices, one of which is supplemental to, and is dependent for effective operation upon the ineffective operation of the other; an actuator in position and adapted for engaging and advancing one or the other of said feed devices; and means carried by said actuator in position and adapted for engaging one of said feed devices, and for limiting the advancing movement of the feed mechanism, substantially as described, and for the purpose set forth.

20. In a registering-apparatus, the combination with the register-train, of a ratchet-feed-wheel in operative connection with said register-train, an escapement-wheel in mesh with said ratchet-wheel, an actuator in position and adapted for directly and reciprocally-operating said ratchet-wheel and escapement-wheel, and means carried by said actuator in position and adapted for engaging the escapement-wheel and for limiting the advancing-movement thereof, substantially as described and for the purpose set forth.

21. In a registering-apparatus, the combination with the register-train, of two meshing feed-wheels, one of which is in operative connection with the register-train, an actuator in position and adapted for reciprocally imparting an advancing movement to said feed-wheels and means carried by said actuator in position and adapted for engaging one of said feed-wheels and for limiting the advancing movement thereof, substantially as described and for the purpose set forth.

22. The combination with a reciprocatory member whose movements are to be registered and with the actuating member of a dial-mechanism, of a duplex- or quarter-stroke-linkage having two dead-centers, and comprising two single-linkages operatively connected together and adapted, one of them, for producing one of the dead-centers at one end, and the other of them the other of the dead-centers at the other end, of the stroke of said duplex-linkage, substantially as described and for the purpose set forth.

23. In a registering-apparatus, in combination, a reciprocatory member whose movements are to be registered, a first and a second register-wheel, having a corresponding number of teeth, and carrying dials, a transmission-lever carried by one of said wheels in position for engagement with the teeth of and adapted for rotating the other wheel, an actuator operatively connected with the first register-wheel, and a duplex-linkage, operatively connecting the actuator and the reciprocatory member, and adapted for rotating said first-wheel to impart an intermittent rotary movement to the second wheel, and comprising two single-linkages and each single-linkage having a dead-center at opposite ends, respectively, of the stroke of the duplex-linkage, substantially as described and for the purpose set forth.

24. In a registering-apparatus, the combination with a reciprocatory member whose movements are to be registered, of a driving and a driven wheel, the driving wheel of which has a series of peripheral teeth, a transmitting lever carried by the driving-wheel and adapted for engaging the teeth of and for carrying said driven-wheel the aliquot part of a complete rotation upon each complete rotation of said lever, and a duplex-linkage in operative connection with the reciprocatory member and driving-wheel, and comprising two single-linkages, of two members each, and each single-linkage having a dead-center at opposite ends, respectively, of the stroke of the duplex-linkage, substantially as described and for the purpose set forth.

25. In a registering-apparatus, the combination with a pair of register wheels adapted for intermittent rotary movements, of a stop-wheel carried by one of said register-wheels a locking-wheel carried by the other of said register-wheels, a reciprocatory wheel-locker intermediate to said locking-wheel and stop-wheel, and adapted for being held normally in engagement with the stop-wheel, to prevent movement thereof, an actuator operatively connected with the locking-wheel a reciprocatory-member, and a duplex-linkage connecting said reciprocatory-member and actuator, and adapted for rotating the locking-wheel to intermittently release the wheel-locker from engagement with the stop-wheel, and comprising two single-linkages each having a dead-center at opposite ends, respectively, of the stroke of the duplex-linkage, substantially as described and for the purpose set forth.

26. In a registering-apparatus, in combination, a reciprocatory-member whose movements are to be registered a pair of register-wheels, a stop-wheel carried by one of the register-wheels, a locking-wheel carried by the other of the register-wheels, a locking-arm in position and adapted for operation by the locking-wheel and for engaging and releasing the stop-wheel, an actuator operatively connected with the locking-wheel and with the reciprocatory member by means of a duplex-linkage consisting of two pivotally connected single linkages, each having a dead-center at opposite ends, respectively, of the stroke of said duplex-linkage, substantially as described and for the purpose set forth.

27. In a registering-apparatus, the combination with a register-wheel and with a locking-wheel carried thereby having a holding-face and a let-off notch, of a second register-wheel and a stop-wheel carried by said register-wheel and having a series of stop-notches, a reciprocatory wheel-locker, in position and adapted for operation by the locking-wheel for engaging and releasing said stop-wheels, actuating-mechanism for the first register-wheel consisting of a reciprocatory-member, an actuator in connection with the first-register wheel, a duplex-linkage connecting the actuator with the reciprocatory-member, and comprising two single linkages each having a dead-center at opposite ends, respectively, of the stroke of the duplex-linkage, and means for intermittently rotating the second-register wheel from the first register-wheel, substantially as described.

28. In a registering-apparatus, in combination, a pair of register-wheels adapted for intermittent movements, a stop-wheel carried by one of said register-wheels and having stop-notches in the periphery thereof, a locking-wheel carried by the other of said register-wheels having a let-off notch formed in its periphery, a wheel-locker having two working-faces, one of which is in bearing contact with the periphery of the locking-wheel, and the other of which is contiguous to a stop-notch of the stop-wheel, and means for rotating the locking-wheel to intermittently throw the wheel-locker out of and into engagement with a stop-notch of the stop-wheel, which means consists of a reciprocatory-member, an actuator operatively connected with the locking-wheel and a duplex-linkage comprising a plurality of single-linkages pivotally connected together and to the reciprocatory-member and actuator and each single-leakage having a dead-center at opposite ends, respectively, of the stroke of the duplex-linkage, substantially as described.

29. In a registering-apparatus, the combination with two dial-carriers of a notched stop-wheel carried by one and a notched locking-wheel carried by the other of said carriers, a pivotally supported locking-lever having at its free end working-faces, one of which working-faces is contiguous to the locking-wheel and the other of which working-faces is contiguous to the stop-wheel, a reciprocatory-member whose movements are to be registered operatively connected with the locking-wheel by means of a duplex-linkage comprising two single-linkages having each a dead-center at opposite ends, respectively, of the stroke of the duplex-linkage, and means for carrying the stop-wheel and aliquot part of a complete rotation at each complete rotation of the locking-wheel, substantially as described.

30. In a registering-apparatus, in combination, a ratchet-wheel carrying a dial, a toothed register-wheel adjacent to said ratchet wheel, a transmission-lever carried by the ratchet wheel and adapted for intermittently engaging the tooth of the adjacent wheel, an actuator carrying a pawl in engagement with the ratchet wheel a reciprocatory-member and a duplex-linkage or quarter-stroke-linkage connecting said reciprocatory member and actuator and comprising two single-linkages and each single-linkage having a dead-center at opposite ends respectively of the stroke of the actuator, substantially as described and for the purpose set forth.

31. In a registering-apparatus, in combination, two register-wheels each having ten peripheral teeth, a transmission-lever carried by one of said wheels and adapted for intermittently engaging the teeth of the next adjacent wheel, an oscillating actuator carrying a pawl in engagement with the teeth of one of said wheels, a stop-wheel carried by one, and a locking-wheel carried by the other, of said wheels, a wheel-locker having two working-faces, one of which is in contact with the locking-wheel and the other of which is contiguous to the periphery of the stop-wheel reciprocatory-member whose movements are registered, and a duplex-linkage connecting the reciprocatory-member and actuator, and comprising two single-linkages each having a dead-center at opposite ends, respectively, of the stroke of the said duplex-linkage, substantially as described and for the purpose set forth.

32. In a registering-apparatus, a pair of toothed register-wheels, one of which carries a transmission-lever in position and adapted for engagement with the teeth of the adjacent wheel, a compound feed device in connection with one of said wheels, it comprising an actuator carrying a pawl in engagement with one of said wheels and having pallets adapted for engagement with the teeth of an escapement wheel, and an escapement wheel adapted to be engaged by said pallets for rotating the said register-wheel in case the pawl should become inoperative, and a reciprocatory member having a linkage connection with the actuator, substantially as described and for the purpose set forth.

33. In a registering-apparatus, in combination, two or more successive register-wheels carrying dials, transmission levers carried by one or more of said register-wheels each of which levers is in position and is adapted for engagement with the next preceding wheels upon one complete rotation of the wheel by which said lever is carried, means for locking the successive register-wheels against movement when the transmission levers are out of engagement therewith and means for rotating the first register of the series of register-wheels, it consisting of a reciprocatory member an actuator in connection with the said first wheel and a duplex linkage connecting the actuator and reciprocatory-member which duplex-linkage consists of two single-linkages each having a dead-center at opposite ends, respectively, of the stroke of the duplex-linkage, substantially as described and for the purpose set forth.

34. The combination with the dial-mechanism of a register, and with a reciprocatory member whose movements are to be registered and whose working stroke consists of an effective period between two neutral periods, of an actuator for the dial-mechanism, and a connection between the reciprocatory-member and the actuator consisting of a linkage having the dead-center periods of its stroke coincident with the neutral periods, respectively, of said reciprocatory-member, substantially as described and for the purpose set forth.

35. The combination with the dial-mechanism of a register, and with the reciprocatory-member whose movements are to be registered and whose working stroke comprises an upper and lower neutral period and a middle period, substantially as described, of an actuator operatively connected with the dial-mechanism and a connection between said actuator and reciprocatory-member consisting of a duplex-linkage comprising two single-linkages, and whose dead-center period coincides with the upper neutral period of the reciprocatory-member and whose effective operation upon the actuator-member takes place near the middle of the complete stroke of the reciprocatory-member, substantially as described and for the purpose set forth.

36. The combination with the dial-mechanism of a register and with the reciprocatory-member whose movements are to be registered and whose working-stroke comprises an upper and lower neutral period and a middle period, of an actuator-member in operative connection with the register-mechanism and a duplex-linkage, connecting the actuator-member and the reciprocatory-member, and comprising two single-linkages, and having the dead-center period of its stroke coincident with the lower neutral period of the reciprocatory-member, and having its effective retractive action upon the actuator take place between the lower neutral period and middle period of the retractive stroke of the reciprocatory-member, substantially as described and for the purpose set forth.

37. The combination with the dial-mechanism, of a register, and with a reciprocatory-member whose movements are to be registered, and whose working stroke consists of an upper and a lower neutral period and a middle period, of an actuator for the dial-mechanism, and a duplex-linkage operatively connecting the actuator and the reciprocatory-member, and consisting of two single-linkages each having a dead-center at opposite ends, respectively, of the stroke of the duplex-linkage coinciding with the upper and lower neutral periods, respectively, of the reciprocatory member, and having the total stroke thereof composed of an active period between the neutral periods, substantially as described.

38. In a registering-apparatus, a pair of toothed register-wheels, one of which carries a transmission-lever in position and adapted for engagement with the teeth of the adjacent wheel, a compound feed device in connection with one of said wheels, it comprising an actuator carrying a pawl in engagement with one of said wheels and having pallets adapted for engagement with the teeth of an escapement wheel, and an escapement-wheel adapted to be engaged by said pallets for rotating the said register-wheel in case the pawl should become inoperative, and a reciprocatory member in operative connection with the actuator, substantially as described and for the purpose set forth.

39. The combination with the reciprocatory member whose movements are to be registered, and with the actuating member of the dial-mechanism, of a duplex linkage consisting of two single linkages each consisting of a link and rocker-arm organized substantially as set forth so that on one stroke of said reciprocatory member one linkage comes to its dead-center position, and on the opposite stroke of said member the other linkage comes to its dead-center position, whereby the resultant movement of the actuator takes place only during the middle portion of the stroke of the reciprocatory member, substantially as described.

40. The combination with the reciprocatory member whose movements are to be registered, and with the actuating member of a dial-mechanism, of two single linkages each comprising a link and a rocker-arm, one of which links is pivotally connected with the actuator, and the other of which links is pivotally connected with the reciprocatory member, and all of which are so organized that one of said linkages comes to its dead-center position at one end of the stroke of the reciprocatory member, and the other of said linkages comes to its dead-center position at the opposite end of the stroke of said member, whereby the effective movement of said linkages together with the actuator takes place at the middle portion of the stroke of the reciprocatory member, substantially as described and for the purpose set forth.

41. The combination with the reciprocatory member whose movements are to be registered and with the actuating member of a registering-mechanism, of a duplex-linkage comprising two links, one of which is pivotally secured to the reciprocatory member, and the other of which is pivotally secured to the actuator, and two intermediate rocker-arms secured at one end to, or formed upon a rocker-shaft at an angle to each other, and pivotally secured at their opposite ends to the aforesaid links and so organized as to have their total strokes resultant from an active period located between the two neutral periods of the reciprocatory member, substantially as described.

42. The combination with the reciprocatory member whose movements are to be registered, and with the actuating-member of a register-mechanism, of the linkage intermediate to said reciprocatory member and actuator, and two feed-wheels, one of which is in operative connection with the registering-mechanism, and means connected with the actuator for operating one or the other of said feed-wheels directly from the actuator whereby the feed-wheel which is directly operated by the actuator rotates the adjacent feed-wheel, substantially as described and for the purpose set forth.

43. The combination with the register-train of a register and with the reciprocatory member whose movements are to be registered, of a ratchet-feed wheel in operative connection with the register-train, a supplemental feed-wheel in operative connection with the ratchet-wheel, and an oscillating actuator in operative connection with the reciprocatory member and carrying means for directly actuating one or the other of said feed-wheels, whereby said register-train may be driven directly by the supplemental feed-wheel through the medium of the ratchet feed-wheel, substantially as described and for the purpose set forth.

44. In a registering mechanism, a peripherally-toothed register-wheel; a peripherally-notched stop-wheel, concentrically carried by, and having its stop-notches in alternating disposition, relatively to the tooth-spaces of, the register-wheel; a locking-wheel located in the peripheral plane of the stop-wheel, and having a let-off notch adapted to register successively with the stop-notches of the stop-wheel; a pivotally-supported wheel-locker having its working-faces intermediate to and in alignment with the axis of the stop-wheel and locking-wheel; and a register-wheel actuator carried by the locking-wheel with its free working-end in position for successively engaging the successive teeth of the register-wheel; and means for rotating the actuator; substantially as described, and for the purpose set forth.

FRANCIS H. RICHARDS.

Witnesses:
 FRED. J. DOLE,
 FREDERICK A. BOLAND.